United States Patent [19]

Baud et al.

[11] 4,041,116

[45] Aug. 9, 1977

[54] METHOD FOR THE MANUFACTURE OF CARBON-CARBON COMPOSITES

[75] Inventors: Michael F. Baud, Elizabethton, Tenn.; Jay A. Harvey, East Amherst, N.Y.

[73] Assignee: Great Lakes Carbon Corporation, New York, N.Y.

[21] Appl. No.: 488,566

[22] Filed: July 15, 1974

Related U.S. Application Data

[63] Continuation-in-part of Ser. No. 360,469, May 15, 1973, abandoned.

[51] Int. Cl.² .............................................. C04B 43/02
[52] U.S. Cl. ............................ 264/29.5; 156/148; 162/152; 264/87; 264/91; 264/114; 423/447.4
[58] Field of Search ............... 264/29, 52, 87, 311, 264/86, 91, 114, 119; 162/152, 153, 102; 161/170; 156/148; 423/447; 428/367

[56] References Cited

U.S. PATENT DOCUMENTS

| | | | |
|---|---|---|---|
| 3,454,691 | 7/1969 | Davis | 264/86 |
| 3,462,289 | 8/1969 | Rohl et al. | 117/46 |
| 3,476,703 | 11/1969 | Wadsworth et al. | 260/40 R |
| 3,534,803 | 10/1970 | Bickerdike | 264/DIG. 19 |
| 3,573,086 | 3/1971 | Lambdin | 264/DIG. 19 |
| 3,617,437 | 11/1971 | Bagg et al. | 264/87 |
| 3,671,385 | 6/1972 | Trent et al. | 423/447 |
| 3,708,451 | 1/1973 | McWhorter et al. | 264/29 |
| 3,720,575 | 3/1973 | Cowlard | 161/170 |
| 3,772,115 | 11/1973 | Carlson et al. | 264/29 |
| 3,790,393 | 2/1974 | Cowland et al. | 264/29 |
| 3,793,204 | 2/1974 | Ardary et al. | 264/29 |

FOREIGN PATENT DOCUMENTS

| | | | |
|---|---|---|---|
| 1,232,007 | 1971 | United Kingdom | 264/DIG. 19 |

*Primary Examiner*—Jeffrey R. Thurlow
*Attorney, Agent, or Firm*—Carl F. Peters

[57] ABSTRACT

A method for manufacturing carbon-carbon composite bodies consisting essentially exclusively of carbon, of about 20 to about 96 weight percent from carbon fiber, from 0 to about 72 weight percent from a carbonaceous flour, and from about 4 to about 15 weight percent from a carbonized resin, which consists in forming a mat by allowing a mixture of the solid ingredients to settle to equilibrium height by the force of gravity or by centrifugation in a solution of the resin and an appropriate solvent, then pressing the settled solids at up to about 100 psi and removing the excess liquid therefrom. Heating the formed and pressed mat to cure the resin, and then baking and optionally graphitizing the cured mat completes the process.

8 Claims, No Drawings

METHOD FOR THE MANUFACTURE OF CARBON-CARBON COMPOSITES

RELATION TO PREVIOUSLY FILED APPLICATIONS

This application is a continuation-in-part of co-pending application Ser. No. 360,469 filed May 15, 1973, now abandoned.

BACKGROUND OF THE INVENTION

Carbon-carbon composites have been proposed for brake shoes, for disc-type brakes on aircraft, for rocket engines, rotary engine seals, and for similar applications where the composite must possess the capability of withstanding extreme temperatures and pressures. Properties such as high specific shear strength and impact strength are necessary for such application. For such purposes, carbon composites prepared from carbon or graphite fibers and a carbonaceous pitch are well known. These composites are particularly well suited as refractory materials but possess certain deficiencies of shear strength and impact strength to withstand the stress occurring in high temperature friction devices as for example brake shoes. The preparation of such carbon-based refractories is accomplished by admixing a carbonizable resin or a pitch from petroleum, coal tar, ethylene tar, or polyvinyl chloride tar sources or like pitches with carbon fibers and carbonizing and graphitizing the resulting body. Due to deformation of the body caused by softening of the pitch at high temperatures, the carbonization is carried out under physical constraint. Attempts to prevent this deformation by surface oxidation of the pitch prior to carbonization cause the formation of a non-graphitizable glassy carbon during the carbonization process. These glassy carbon structures do not possess the required physical properties for high temperature refractories. The use of mixtures of pitch and pitch-like materials thermosetting resins necessary to provide a rigid body is such that voidfree graphitizable carbon-carbon bodies have been difficult to fabricate.

SUMMARY OF THE INVENTION

For the purpose of this description and the claims, carbon refers to carbon and graphite as these terms are known to those skilled in the art.

This invention provides porous carbon mats which can be suitably densified to form composite bodies with extremely high structural properties of strength and modulus. More particularly, this invention relates to methods for forming carbon mats comprising a mixture of an organic resin of the thermosetting type, carbon fibers, and optionally, a carbonaceous flour, molded to a final desired shape and then set or cured, carbonized and, if desired, graphitized. After manufacture, the carbonized or graphitized piece can be densified with pyrolytic carbon, or by impregnation with a pitch, or by the same or a different resin used in fabrication of the piece and rebaked and graphitized or regraphitized to form the desired carbon-based refractories. The composite mats prepared by the method of this invention comprise an essentially exclusively carbon body consisting of from about 20 to about 96 weight percent of carbon from carbon fibers, from about 4 to about 15 weight percent of carbon from a resin binder and from about 0 to about 72 weight percent carbon from a carbonaceous flour.

By the process of this invention, the solid ingredients are admixed with a solution of the resin binder in an appropriate solvent. The solids are allowed to settle by gravity or by centrifugation until an equilibrium height mat has been obtained. This mat of solids is then pressed at up to about 100 psi and the excess solution is removed therefrom by vacuum.

The resulting formed mat is heated to cure the resin and the cured resinous mat is carbonized and optionally graphitized by well known methods in the prior art.

By the technique of this invention a mat of uniform thickness, composition, and density is obtained.

Of particular advantage realized by the method of this invention is the orientation of the fiber species in the completed mat. The fibers are randomly oriented in the plane perpendicular to the direction of force used to settle the fibers with essentially no fibers oriented in the axis parallel to the settling force. Were an extraneous force allowed to react on the fibers prior to complete settling, as for example the solvent resin mixture being pulled through the fibers, the orientation would be disrupted with deleterious effects on the properties of the mat.

Of particular use for this invention are the high performance carbon fibers prepared from stretch aligned organic precursor fibers which are carbonized under tension so as to maintain the alignment, as by the method of Johnson et al, U.S. Pat. No. 3,412,062, issued Nov. 19, 1968, or those that are stretch annealed after carbonization as by the method of Spry, U.S. Pat. No. 3,454,362, issued July 8, 1969. Such fibers can possess tensile strengths above 100,000 psi and modulus of elasticity of 30,000,000 psi or higher.

Carbon fibers can be surface treated after carbonization to improve the bond between the fiber and a resin matrix when the fiber is to be used in a fiber-resin composite. Such surface treatment can include the deposition of a substance on the surface as for example pyrolytic carbon, silicon carbide, tungsten carbide or the like, or it can include the oxidative removal of a portion of the surface with oxygen, sulfuric acid, phosphoric acid, chromic acid, or like oxidizing agents or mixtures thereof.

DETAILED DESCRIPTION OF THE INVENTION

Carbon bodies prepared by the method of this invention contain carbon from three sources:

1. Carbon fibers. Carbon fibers are prepared by heating a natural or synthetic fibrous precursor to above about 900° C. while preserving the filamentous nature of the fiber. Generally this heating is carried out in a non-reactive atmosphere as for example argon or nitrogen. They may be produced from polyacrylonitrile or other acrylic precursors or mixtures thereof in which case an oxidation or stabilization step is desirable prior to carbonization. Typically, the acrylic precursor is heated in an oxygen containing atmosphere at about 200°-300° C. for a time sufficient to allow further processing at higher temperatures without loss of the filamentous nature of the precursor. The preferred carbon fiber for the process of this invention is a so-called "dog-bone" cross-section fiber prepared from an acrylic precursor. By acrylic, as used in the present invention, is meant a resinous composition containing 85 mol percent or more of polyacrylonitrile and 15 mol percent or less of one or more monovinyl units copolymerized therewith, said copolymerized units being of the units consisting of styrene, methyl acrylate, methyl methacrylate, vinyl acetate, vinyl chloride, vinylidene chloride, vinyl pyridine, and the like or a plurality of such monomers.

It has been found that high-modulus acrylic-based carbon fibers which have been surface treated by reaction with chromic acid or the like are particularly well suited for composites containing graphitized carbon flour and thermatomic carbon. Thus, in a preferred embodiment of this invention, thermatomic carbon and surface treated high modulus carbon fiber are dispersed in a high carbon yield resin, as for example a phenolic resin to form a composite of high specific properties.

Carbon fibers useful for this invention should be less than 0.1 inches in length, preferably from about 0.01 to about 0.05 inches in length, and should have a diameter in the range of from about 3 to about 50 microns. Carbon fibers of this length can be chopped from the fibers of longer lengths by a conventional chopping apparatus available for that purpose.

Conveniently the carbon fibers can be prepared by chopping longer lengths of carbon fiber as for example to about ⅛ inch to 1 inch in length, dispersing the fibers in a liquid, and whipping the dispersion in a commercial household blender at about 25,000 rpm for about 10 minutes. The dispersion is then removed and the fibers are separated and dried.

More conveniently, the fibers can be cut into the above ⅛ to 1 inch lengths, mixed with the resin/binder solution to be used for preparing the mats, and the flour component if desired, and prepared as above or stirred in a sigma-blade mixer at about 48 to 96 rpm for about one hour. The slurry is then poured directly into the vessel used for preparation of the mat. If additional solvent or resin/solvent mixture is needed, the dispersion is then preferably added to the solvent/resin system and dispersed therein to expedite mixing prior to the settling step.

If the fibers are previously cut and isolated, as above described, they are admixed with a carbonaceous flour component, if such a component is used, and the solids are thoroughly mixed into a resin binder solution in an appropriate solvent, as previously identified.

2. Resin matrix. Resins useful for this invention include the thermosetting resins well-known to those skilled in the art of fiber resin composites.

Resins useful for preparing the composites of this invention include phenolic resins, polyimide resins, furfuryl resins, polyphenylene, epoxy resins, and the like.

Preferred resins are those with high char yields, that is, those resins which provide the greatest weight percentage of amorphous carbon when baked to carbonizing temperature. A thorough discussion of char yield of resins has been published in 1969 by H. A. Mackay as "The Conversion of Synthetic Resins to Amorphous Carbon" as is available as report SC-RR-66-296 from National Technical Information Service, U.S. Dept. of Commerce.

In short summary those preferred resins include: phenolic polymers except those wherein the para position is blocked with either a phenyl or methyl group; linear polymers of furfuryl alcohol, polysulfones, polyphenylene oxide; polyvinyl chloride; epoxy resins particularly epoxylated phenol alkehyde polymers, phenol glyoxaldehyde resin, aromatic and heterocyclic and heteroaromatic polymers particularly where one carbon atom separates the aromatic moieties.

Catalysts for the epoxy and novolac resins also influence char formation and catalysts which allow or cause cyclization or fusion during carbonization are preferred since these reactions provide higher carbon yield than do scission reactions during carbonization.

Typical of the resins that provide the thermosetting quality, the bonding qualities, and the char yield suitable for this invention include resins based upon the following skeletal arrangements:

phenol formaldehyde
phenol glyoxaldehyde
resorcinol formaldehyde
phenol furfuraldehyde
resorcinol furfuraldehyde
P, P'-dihydroxybiphenyl formaldehyde
bis-(P-hydroxyphenyl)-methane formaldehyde
bis-(P-hydroxyphenyl)-sulfone formaldehyde
1,5-dihydroxynaphthalene formaldehyde
phenol formaldehyde-trimethyl silane
diphenyl oxide-phenol formaldehyde
furfuryl alcohol oxalic acid
furfuryl alcohol
phenol-formaldehyde/phenol
diallyl isophthalate/styrene
ethylene glycol-maleic anhydride-dicyclopentadiene triallylcyanurate
polymethyl phenyl silicone
poly-diphenyl silicone epoxidized phenol-formaldehyde
1,1,2,2-[tetrakis-(p-glydidyloxy phenyl)]-ethane
epoxidized o-cresol formaldehyde
resorcinol diglycidyl ether
poly-P,P'-dicyanobiphenylmethylene
3,4,9,10-perylenetetracarboxylic dianhydride resin.

In order to provide a solution of proper density and viscosity for the suspended solids to settle uniformly during the preparation of the mats, the resinous binder is usually diluted with a substantial quantity of a miscible non-reactive solvent therefor. Solvents useful for this purpose can include di-lower- alkyl ketones, di-lower-alkyl ethers, lower alkyl alcohols, dimethyl sulfoxide, thiophene, dioxane, acetonitrile, tetrahydrofuran, pyridine, and the like, and mixtures of the above and similar solvents.

The solvent chosen provides a density ratio of solvent/resin to solids of preferably about 1:2 since a density ratio closer to 1:1 would slow the settling time and more diverse ratios would tend to allow too rapid settling leading to mats non-uniform in thickness and composition. Apparently, however, a fairly wide range of variations of liquid-solid densities from the preferred 1:2 ratio will not cause separation of the carbon flour, when used, and fiber dispersion during settling. Thus, for example, a mixture of calcined coke flour of true density 2.05 g./ml and a carbon fiber of true density 1.75 g./ml will not readily separate in a solution of phenol/formaldehyde resin in methyl ethyl ketone of density 0.80 g./ml.

Further, the volume of solvent should be chosen to provide a solids-to-liquid ratio of from about 1:50 to about 1:30 depending upon the ratio of fiber to flour in the solids component. Although a lesser concentration of fibers is clearly operative, commercial considerations denominate that the least amount of solvent needed to provide a proper slurry for mat formation be used.

Still further, the volume of solvent should be chosen to provide a proper residue of resin carbon in the finished artifact. For those mats pressed to about 8 psi a solvent to resin volume ratio of about 20:1 is appropriate while for those mats pressed to about 60 psi a solvent to resin volume ratio of about 6:1 provides the appropriate quantity of resin since the added pressure tends to remove more of the liquid components.

3. Carbonaceous flour. Carbonaceous flour useful for the present invention consists of essentially elemental carbon particles of less than 50 microns in diameter. These carbon particles can be of a coal, petroleum, resin, or like origin. Additionally, they can include lamp black, carbon black, pyrolytic graphite, thermatomic carbon, or the like.

When the flour is a petroleum or resin origin, as for example from ethylene tar or the like, it can be obtained from the thermal or catalytic cracking of the petroleum or like residues by heating the residues to coking temperatures and allowing the heated residues to carbonize. The product thus prepared, typically called raw petroleum coke, can be used directly or further heated at to about 1200° C. to prepare a calcined petroleum coke.

Thermatomic carbon is a thermal decomposition carbon collected from effluent gases of a furnace in which hydrocarbon gases e.g., natural gas or waste refinery gas, are substantially completely disassociated into carbon and hydrogen at temperatures at 1200°–1400° C. or higher in the absence of oxidizing gases.

In all of the above cases, the flour can be more or less graphitic in nature. Thus, it may have been carbonized to about 800° to about 900° C., calcined to about 1200° C. to 1300° C. as described above, or it may have been further heated to about 2500° to about 2800° C. to effect graphitization.

During settling of the solid components there may or may not be slight filtration of the liquid component of the slurry through the porous septum used subsequently to remove the excess of the liquid component. This filtration should be controlled in order to preserve the orientation of the fibers to the plane perpendicular to the axis of the settling force. When the mat is formed due to the action of gravity, the loss of liquid through a coarse filter paper septum is not sufficient to disrupt the orientation of the fibers. However, use of a coarser septum plate or higher G forces as for example during centrifugation, will cause disorientation of the fibers without blockage of the filtration due to the effect of filtration itself on the surface of the elongated fibers. In such cases, filtration through the septum during settling is prevented by pressure exerted below the septum, by the insertion of a non-porous septum below the porous septum to prevent filtration, or by a similar mechanical method to prevent liquid flow.

In a preferred embodiment of this invention, a vertically mounted pipe, fitted on the low end with a sintered glass or metal or a porous plastic plate or the like, of sufficient diameter to contain a mat of a desired size and of sufficient height to contain the solid-solvent/resin mixture is a preferred vessel in which to form the mat. The dispersion is poured into the vessel and allowed to settle by the force of gravity until an equilibrium height of solid mat is obtained. The excess solution is then removed, preferably by the application of a slight vacuum and the mat is compressed at from about 8 to about 100 psi. In order to obtain a pressure of about 15 psi, a full vacuum can be applied to the mat in a confined space, as for example by placing a rubber diaphragm above the formed mat the allowing the vacuum to conform the diaphragm to the shape of the mat. Otherwise, a typical mold and piston arrangement can be used to apply pressures greater than 15 psi.

Alternatively, mats of irregular shape can be formed by providing a suitable receptacle for the dispersion with appropriately shaped and sized walls of porous material wherein the mat can be formed by centrifugally conforming the mat to the shape of the walls as for example by spinning the whole receptable around a suitable axis either within or without the receptacle.

Further, composites of this invention can be formed conforming to the desired shape of the finished artifact or a large mat can be manufactured and cut to the desired shape after processing.

After the above forming steps have been accomplished, the mat can be baked and optionally graphitized by heating the mat to about 1000° C. to 2800° C., methods well-known to the art and more specifically exemplified hereinbelow.

In order to indicate more fully the nature of the abovedescribed process, the following few examples of the procedure are set forth, it being understood that these examples are presented as illustrative only and not as limiting the scope of the invention.

EXAMPLE 1

A mixture of 24g. of carbon fiber (Fortafil 4T, Great Lakes Carbon Corporation, New York, New York), chopped to about 0.02 average inch length, 51g. of phenol-formaldehyde resin (Durez 7421, Durez Plastics Division, Hooker Chemical Corporation, North Tonawanda, N.Y.) and 1,000 ml of methyl ethyl ketone was stirred in a mixer for about 5 minutes. The resulting slurry was poured into a 3½ inch diameter aluminum pipe fitted with a porous Teflon base upon which a cellulose fiber paper had been placed. The slurry was allowed to settle for about 15 minutes until an equilibrium mat height resulted and the resin/solvent mixture had filtered therethrough as a result of gravity. A vacuum was then applied below the porous base and the surplus solvent/resin mixture was further removed through the formed mat. The formed mat was cured by heating to 150° C. for one hour, baked according to the following schedule: linear cycle to 1,000° C. over 10 hours, cooled, and graphitized to 2,000° C. according to the following schedule: room temperature to 1,000° C. for 1 hour and 1,000° C. to 2,000° C. at 4°/minute.

EXAMPLE 2

A mixture of 38g. of carbon fibers, (Fortafil 4T, Great Lakes Carbon Corporation, New York, New York), chopped to about 0.02 inch in average length, 262g. of phenol formaldehyde resin (Durez 7421, Durez Plastics Division, Hooker Chemical Corporation, North Tonawanda, New York) and 1600 ml of methyl ethyl ketone was stirred for about 5 minutes. The resulting slurry was poured into a 3¼ inch diameter glass pipe fitted with a porous Teflon base upon which a filter paper had been placed. The slurry was allowed to settle for about 15 minutes to an equilibrium height and the resin/solvent mixture filtered therethrough by gravity. Vacuum was applied below the porous base and the surplus solvent/resin mixture was further removed through the formed mat. A Teflon-lined piston was placed on the upper surface of the mat and a pressure of 60 psi was applied thereto. The excess liquid was withdrawn by vacuum and the mat cured at 150°C. for one hour under the applied pressure. The formed mat was baked according to the following schedule: linear cycle to 1,000° C. over 10 hours, cooled, and graphitized to 2,000° C. according to the following schedule: room temperature to 1,000° C. for 1 hour and 1,000° C. to 2,000° C. at 4°/minute.

EXAMPLE 3

A mixture of 26g. of carbon fiber (Fortafil 4T, Great Lakes Carbon Corporation, New York, New York) chopped to about 0.02 inch in length, 26g. of thermatomic carbon, 52g. of phenol-formaldehyde resin (Durez 7421, Durez Plastics Division, Hooker Chemical Corporation, North Tonawanda, New York) and 1,050 ml of methyl ethyl ketone was stirred for about 5 minutes. The resulting slurry was poured into a 3½ inch diameter aluminum pipe fitted with a porous Teflon base upon which a cellulose fiber paper had been placed. The slurry was allowed to settle for about 15 minutes until an equilibrium mat height resulted and the resin/solvent mixture had filtered therethrough as a result of gravity. A vacuum was then applied below the porous base and the surplus solvent/resin mixture was further removed through the formed mat. The formed mat was cured by heating to 150°C. for one hour, baked according to the following schedule: linear cycle to 1,000°C. over 10 hours, cooled, and graphitized to 2,000°C. according to the following schedule: room temperature to 1,000°C. for 1 hour and 1,000°C. to 2,000°C. at 4°/minute.

EXAMPLE 4

A mixture of 38g. of carbon fibers (Fortafil 4T, Great Lakes Carbon Corporation, New York, New York), chopped to about 0.02 inch in length, 38g. of thermatomic carbon, 129g. of phenol formaldehyde resin (Durez 7421, Durez Plastics Division, Hooker Chemical Corporation, North Tonawanda, N.Y.) and 1300 ml of methyl ethyl ketone was stirred for about 5 minutes. The resulting slurry was poured into a 3¼ inch diameter glass pipe fitted with a porous Teflon base upon which a filter paper had been placed. The slurry was allowed to settle for about 15 minutes to an equilibrium height and the resin/solvent mixture filtered therethrough by gravity. Vacuum was applied below the porous base and the surplus solvent/resin mixture was further removed through the format mat. A Teflon-lined piston was placed on the upper surface of the mat and a pressure of 60 psi was applied thereto. The excess liquid was withdrawn by vacuum and the mat cured at 150° C. for one hour under the applied pressure. The formed mat was baked according to the following schedule: linear cycle to 1,000° C. over 10 hours, cooled, and graphitized to 2,000° C. according to the following schedule: room temperature to 1,000° C. for 1 hour and 1,000° C. to 2,000° C. at 4° /minute.

We claim:

1. A method for the manufacture of carbon mats consisting of carbon from about 20 to about 96 weight percent from carbon fiber, from 0 to about 72 weight percent from a carbonaceous flour, and from about 3 to about 15 weight percent from a carbonized resin which consists in:
   a. combining the appropriate quantities of carbon fibers of from 0.01 to 0.05 inches in length, a thermosetting resin and solvent therefor, and a carbonaceous flour so that the liquid to solid weight ratio is from about 50:1 to about 30:1, and the solvent to resin ratio is about 6:1 to about 20:1;
   b. allowing the solids to settle to equilibrium height in the liquid;
   c. pressing the settled solids at up to about 100 psi and removing the excess liquid therefrom by vacuum;
   d. heating the resulting mat to a sufficient temperature to cure the resin; and
   e. carbonizing the resulting mat by heating to a temperature between about 1000° C. to about 2800° C., to form a mat wherein the fibers are oriented randomly in the plane perpendicular to the direction of force used to settle the fibers and with no fibers oriented in the axis parallel to the settling force.

2. The method of claim 1 wherein the carbonaceous flour component consists of thermatomic carbon.

3. The method of claim 1 wherein the carbon fibers are of about 0.02 inches in length.

4. The method of claim 1 wherein the resin is a phenolic resin.

5. The method of claim 1 wherein the settled mat is pressed at about 60 psi in step c).

6. The method of claim 1 wherein the settled mat is pressed at about 8 psi in step c).

7. The method of claim 1 wherein the solids are settled by the force of gravity.

8. The method of claim 1 wherein the solids are settled by the force of centrifugation.

* * * * *